United States Patent
Kjar (10) Patent No.: US 9,618,135 B1
(45) Date of Patent: Apr. 11, 2017

(54) VALVE LOCKOUT DEVICE

(71) Applicant: JB Karelock LLC, Omaha, NE (US)

(72) Inventor: Joseph D. Kjar, Buffalo, MO (US)

(73) Assignee: JB KARELOCK LLC, Omaha, NE (US)

(*) Notice: Subject to any disclaimer, the term of this patent is extended or adjusted under 35 U.S.C. 154(b) by 0 days.

(21) Appl. No.: 15/068,280

(22) Filed: Mar. 11, 2016

(51) Int. Cl.
*F16K 35/06* (2006.01)
*F16K 35/10* (2006.01)
*F16K 5/00* (2006.01)
*F16K 35/00* (2006.01)
*E05B 67/00* (2006.01)

(52) U.S. Cl.
CPC ............ *F16K 35/10* (2013.01); *E05B 67/003* (2013.01); *F16K 5/00* (2013.01); *F16K 35/00* (2013.01); *F16K 35/06* (2013.01)

(58) Field of Classification Search
CPC .......... F16K 35/00; F16K 35/04; F16K 35/06; F16K 35/10
USPC ......... 70/158, 159, 163, 164, 166, 175–180, 70/229–232
See application file for complete search history.

(56) References Cited

U.S. PATENT DOCUMENTS

| | | | | |
|---|---|---|---|---|
| 1,780,994 A * | 11/1930 | Caldwell | ................. | F16K 35/10 70/178 |
| 1,947,081 A * | 2/1934 | Grady | ..................... | F16K 35/10 292/DIG. 2 |
| 2,377,036 A * | 5/1945 | Quarfoot | ................. | F16K 35/10 70/178 |
| 3,206,955 A * | 9/1965 | Horovitz | ................ | B65D 55/14 215/207 |
| 4,466,259 A * | 8/1984 | Osgood, Sr. | ....... | B60K 15/0409 70/164 |
| 4,876,867 A * | 10/1989 | Leneave | ............... | E05B 13/001 292/DIG. 2 |
| 5,052,203 A * | 10/1991 | Van Cuyk | ............ | B62D 53/085 70/232 |
| 5,613,386 A * | 3/1997 | Mire, Sr. | ................ | B63H 5/165 70/18 |
| 6,092,402 A * | 7/2000 | Porcelli | ................ | A63C 11/005 70/18 |
| 6,123,098 A * | 9/2000 | Gremillion, III | ....... | F16K 35/10 137/377 |
| 6,843,083 B2 * | 1/2005 | Smith | ..................... | F16K 35/10 137/385 |
| 8,074,960 B2 * | 12/2011 | Milbeck | .................. | F16K 35/10 251/90 |
| 8,893,534 B1 * | 11/2014 | Niemi | ..................... | F16K 35/10 137/383 |

* cited by examiner

*Primary Examiner* — Christopher Boswell
(74) *Attorney, Agent, or Firm* — Erickson Kernell IP, LLC (57) ABSTRACT

A valve lockout device includes an elongated main body defining an interior cavity for receiving a valve to be secured. A cap with a notch for receiving a cable is affixed to one end of the main body, with a wing pivotably attached to the cap so that the wing movable between an open position and a closed position. The wing in the closed position is operable to secure a cable with the notch in the cap. With the lockout device in place over a valve and a cable secured around the valve and to the lockout device, the valve is secured against operation and users and operators are notified of the lockout condition.

18 Claims, 8 Drawing Sheets

VALVE LOCKOUT DEVICE

CROSS-REFERENCE TO RELATED APPLICATIONS

Not Applicable.

STATEMENT REGARDING FEDERALLY SPONSORED RESEARCH OR DEVELOPMENT

Not applicable.

BACKGROUND OF THE INVENTION

1. Field of the Invention

The present invention is directed generally to the field of valve safety devices, and more specifically to a lockout device for manually operated valves.

2. Description of Related Art

Lockout and tag-out devices for manually operated fluid control valves are known in the art. Fluid control valves are commonly used to regulate the flow of fluids and flowable materials, such as liquids, gases, and the like. Such lockout and tag-out devices are used, for example, to prevent the operation of a valve while a system associated with the valve is undergoing maintenance, and to notify others that a particular valve should not be operated. A lockout device typically inhibits operation of the valve, such as by securing the valve handle in place to prevent it from being turned. A tag-out device is typically a notification tag attached to the valve notifying others that a valve should not be operated. Alone or in combination, lockout and tag-out devices serve to protect operators of equipment and personnel who maintain that equipment by notifying that a particular valve should not be operated and by inhibiting or preventing operation of the valve.

Various forms of lockout and tag-out devices are known in the art. For example, it is common to route a cable through a valve handle and to attach a padlock or clip to secure the cable in place. Such known devices and methods, however, are limited in the amount of security provided and the types of valve arrangements they can effectively be used with. For example, a cable simply strung through a valve handle allows the valve to still be operated over a fairly wide range due to slack in the cable. And, a cable alone is insufficient to secure a valve which does not have a handle—a common scenario in systems where valve handles are removed to prevent casual or accidental operation of a valve. Thus it can be seen that there remains a need in the art for a lockout device for manual valves that provides for inhibiting the operation of a valve and is usable with various types and configurations of valves.

BRIEF SUMMARY OF THE INVENTION

The present invention is directed to a valve lockout device suitable for inhibiting the operation of manually controlled valves and notifying users and operators that valve should not be used.

In one aspect of the present invention, the valve lockout device includes an elongated main body extending between first and second ends, with the walls of the main body defining an interior cavity for receiving at least a portion of a valve to be secured. A cap is affixed to one end of the main body, covering at least a portion of that end, with a notch formed in the cap, the notch extending inwardly from an outer periphery of the cap towards the center of the cap. A wing is pivotably attached to the cap, the wing movable between an open position in which the body of the wing is positioned away from the main body, and a closed position in which the body of the wing is positioned adjacent the main body. The wing in the closed position is operable to secure a cable with the notch in the cap. With the lockout device in place over a valve and a cable secured around the valve and to the lockout device, the valve is secured against operation and users and operators are notified of the lockout condition.

In another aspect of the present invention, the lockout device includes a cable affixed to the cap. In use, the cable is routed through one or more apertures in a handle of a valve to be secured, and/or around the body of the valve, the cable is then secured in the notch in the cap.

In another aspect of the present invention, the cap of the lockout device substantially covers the first end of the main body, in another aspect the cap is larger than the first end such that a lip extends outwardly around a perimeter of the cap.

In another aspect of the present invention, the cap and the wing each include apertures extending therethrough which align when the wing is in the closed position to allow the wing to be secured in the closed position using a padlock, clip, or other locking device inserted through the apertures.

In another embodiment of the present invention, two opposing wings are pivotably attached to the cap. In use, the two wings pivot inwardly together to a closed position in which a cable is secured within the notch in the cap.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF EXEMPLARY EMBODIMENTS

Figure 1:
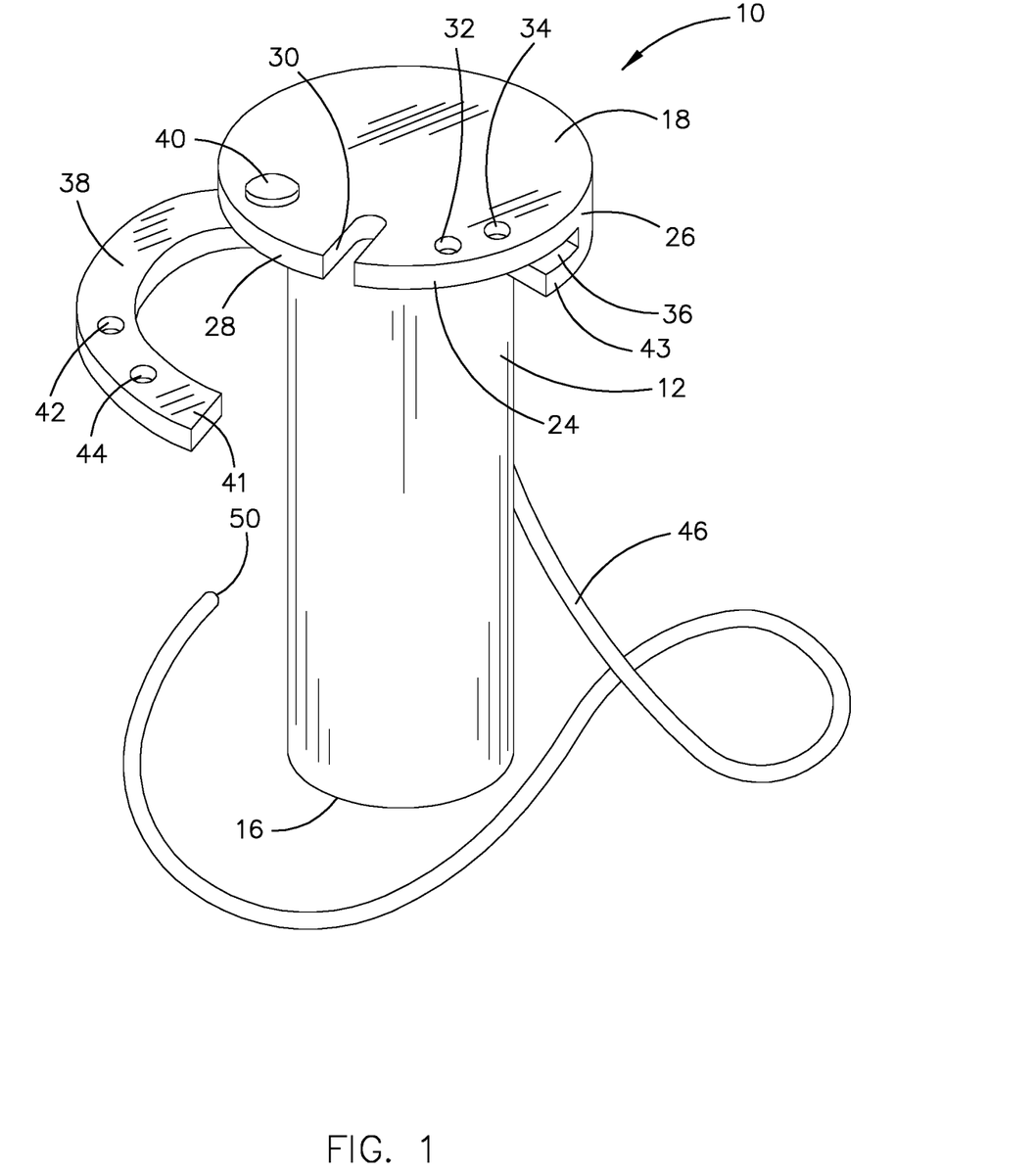
FIG. 1 is a front perspective view of a lockout device in accordance with a first exemplary embodiment of the present invention.
Figure 2:
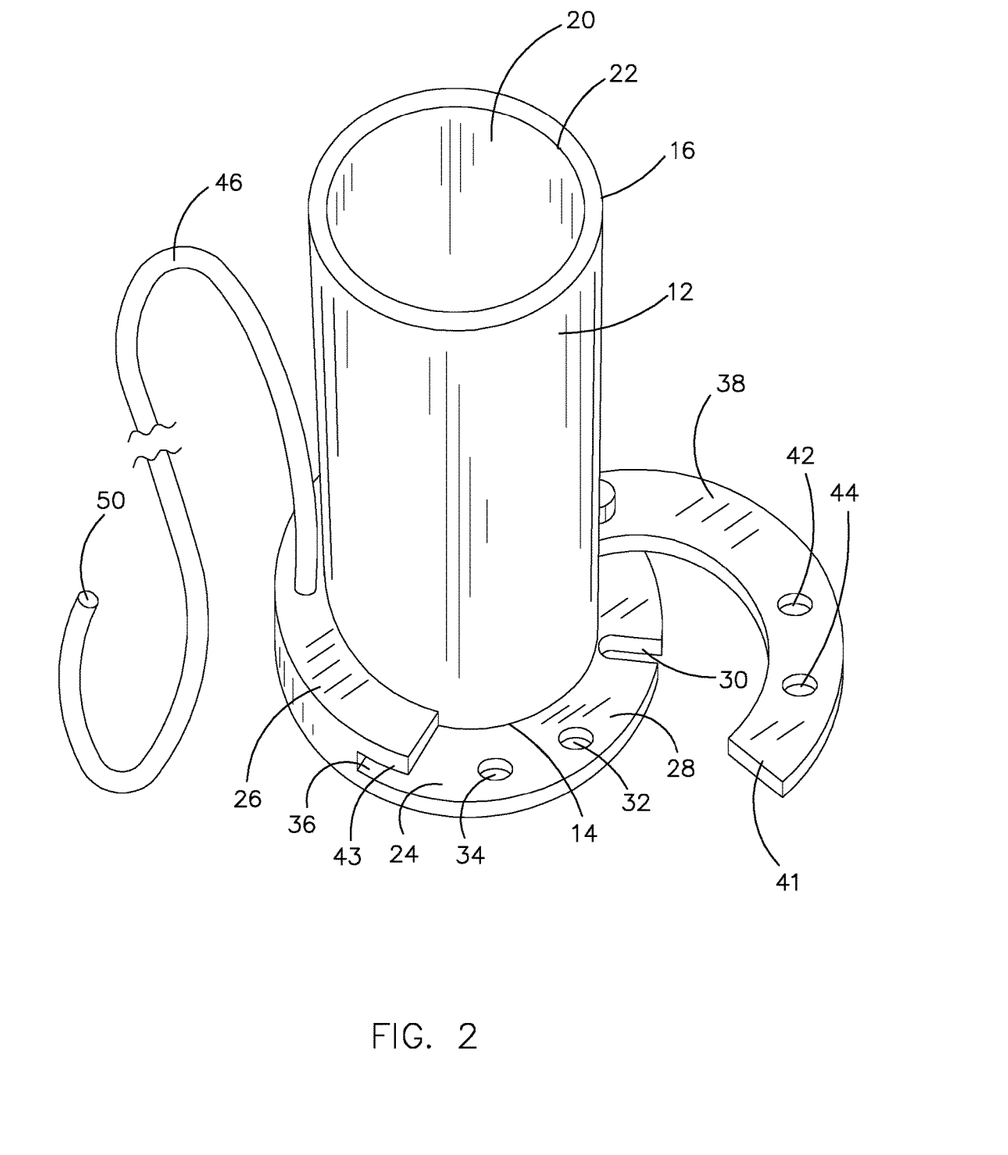
FIG. 2 is a bottom perspective view of the lockout device of FIG. 1.

Looking to FIGS. 1 and 2, a valve lockout device in accordance with a first exemplary embodiment of the present invention is depicted generally by the numeral 10. The lockout device 10 comprises a hollow cylindrical main body 12 extending between a first, upper end 14 and a second, lower end 16. A generally circular cap 18 is affixed to the upper end of the main body, with the lower end of the main body remaining open as depicted in FIG. 2, allowing access to an interior cavity 20 defined by the inner wall 22 of the cylindrical main body. The cap 18 is preferably affixed to main body 12 using a glue or adhesive, or by welding, alternatively the cap may be attached to the main body with screws, brads or other fasteners known in the art.

Looking still to FIGS. 1 and 2, the circular cap 18 is positioned concentrically with the longitudinal center axis of the cylindrical main body 12, but is larger in diameter, such that the cap covers the upper end of the main body 12 with a lip 24 protruding outwardly around the periphery of the upper end of the main body. The lip 24 comprises a wider portion 26 extending around approximately half of the circumference of the main body, with a narrower portion 28 extending around the remaining circumference. In the embodiment depicted in the figures, the wider portion of the cap is approximately three times the thickness of the narrower portion. The narrower portion 28 of the lip 20 includes an elongated "U"-shaped notch 30, extending inwardly from the outer perimeter of the lip towards the center of the cap 18, the notch positioned approximately midway along the narrower portion 28 of the lip. Two apertures, 32, 34 are positioned in spaced-apart relationship, also along the narrower portion 28 of the lip, inboard from the outer perimeter of the cap and to one side of the "U"-shaped notch 30.

As best seen in FIG. 2, looking to the underside of the cap 18, a slot 36 is positioned at the transition between the wider portion 26 and the narrower portion 28 of the lip. Slot 36 is formed between the bottom surface of the narrower portion 28 of the lip and the protrusion 43 of the bottom surface of the wider portion 26 of the lip. The width of slot 36 is approximately equal to the thickness of the narrower portion of the lip, or approximately one-third of the thickness of the wider portion of the lip.

Figure 4:
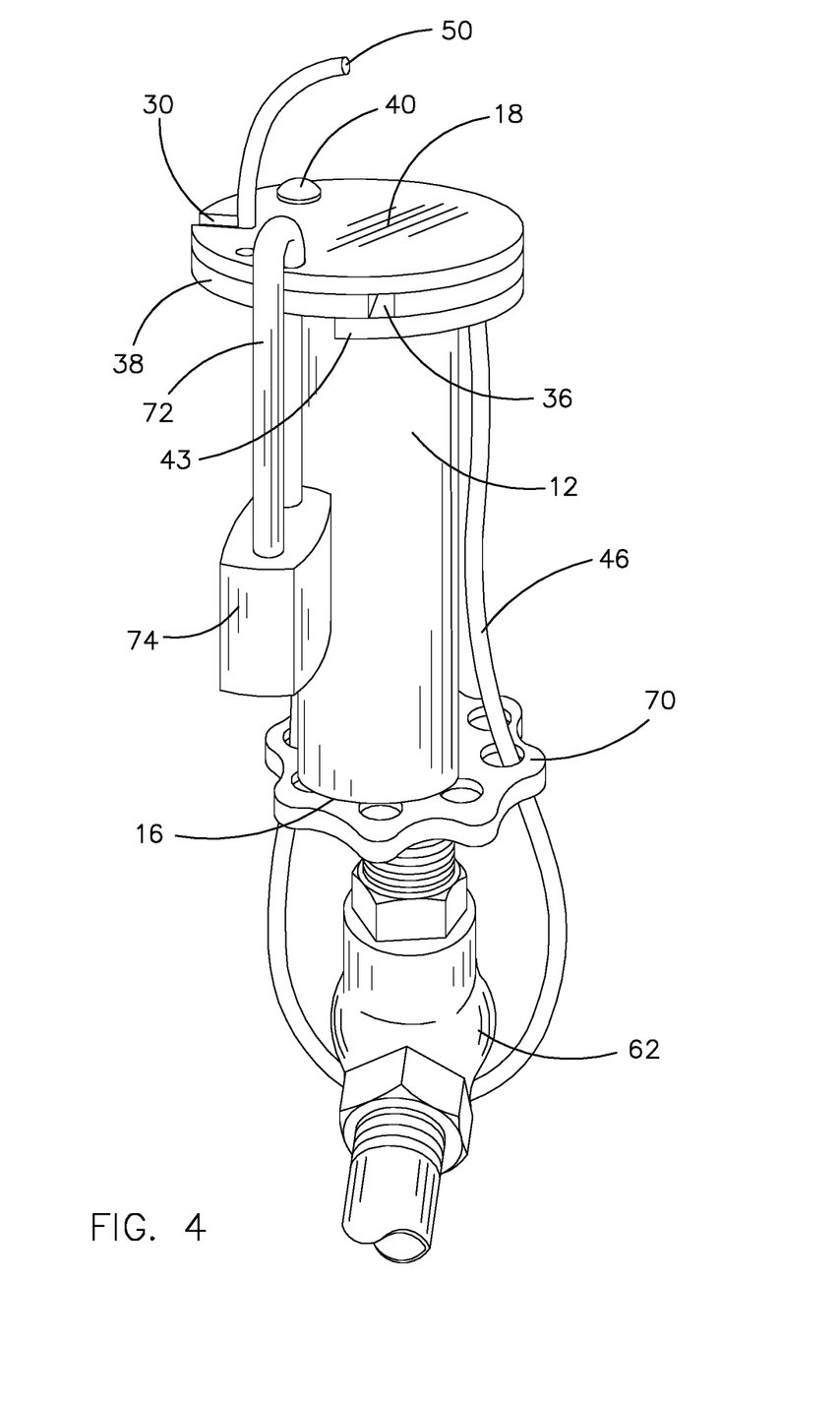
FIG. 4 is a side perspective view of the lockout device of FIG. 1 in use with the valve of FIG. 3.

An arc shaped wing 38 is pivotably attached at one end to the narrower portion 28 of the lip 20 by a fastener 40, the other end 41 of the wing unattached and free to move as the wing is rotated about its pivot point. The fastener 40 preferably includes a cylindrical body that extends through the wing and lip, allowing the wing to easily pivot. Fastener 40 is preferably made of metal, and is a rivet type fastener. Alternatively, other fasteners of any material known in the art may be employed, such as metal or plastic screws, bolts, or pins. The wing 38 includes two apertures 42, 44 positioned in spaced-apart relationship, inboard from the outer perimeter of the wing and inboard from the free end 41 of the wing. As can be seen in FIGS. 1-2 and 4, the wing 38 can be pivoted between an open position (as depicted in FIGS. 1 and 2) and a closed position (as depicted in FIG. 4). In the open position, the inner perimeter of the wing is spaced away from the main body 12, in the closed position, the inner perimeter of the wing is positioned adjacent the main body, conforming closely to the outer wall of the main body. As can also be seen in the figures, with the wing 38 in the closed position, the apertures 42, 44 in the wing are aligned with the corresponding apertures 32, 34 in the cap 18, and the free end 41 of the wing is aligned within slot 36 so that the wing fits snugly against the main body.

The main body 12, cap 18, and wing 38 are preferably manufactured or formed from a rigid, strong material such as a plastic, metal, or composite material. Most preferably, they are made of polyvinyl chloride (PVC) or other plastic material.

Looking back to FIGS. 1 and 2, a first end of a cable 46 is affixed approximately at the midpoint of the wider portion of the lip. Preferably the cable is secured within a bore in the lip using glue or other adhesive. Alternatively, the first end of the cable may be welded, bolted, or attached using any other fastening method known in the art. The second end 50 of the cable is unattached so that a user of the lockout device can route the cable to secure the lockout device to a valve as will be described in more detail below. The cable 46 is preferably made from a strong, flexible material, such as braided metal strands. Most preferably, the cable is coated with a flexible covering, such as vinyl, to protect the underlying cable and to prevent the cable from marring or scratching any items it comes in contact with. Preferably, the length of the cable 46 is at least three times the length of the main body 12.

With the structure of the lockout device 10 generally set forth, the operation and use of the described embodiment of the device in conjunction with a typical manually operated valve having an attached handle will now be described with reference to FIGS. 3 and 4. Looking first to FIG. 3, a typical manually operated valve as known in the prior art is designated generally by numeral 60. The valve 60 includes a valve body 62, having an inlet port 64 and an outlet port 66. A valve stem extends upwardly from the valve body, with a valve handle 70 attached to the valve stem, the handle allowing a user to rotate the valve stem to operate the valve. The valving element within the valve body 62 may be a gate valve, a ball valve, a butterfly valve, or any other type of valve mechanism known in the art. In operation, rotation of the valve handle 70 in turn rotates the valve stem which actuates the valving element within the valve body.

Figure 3:
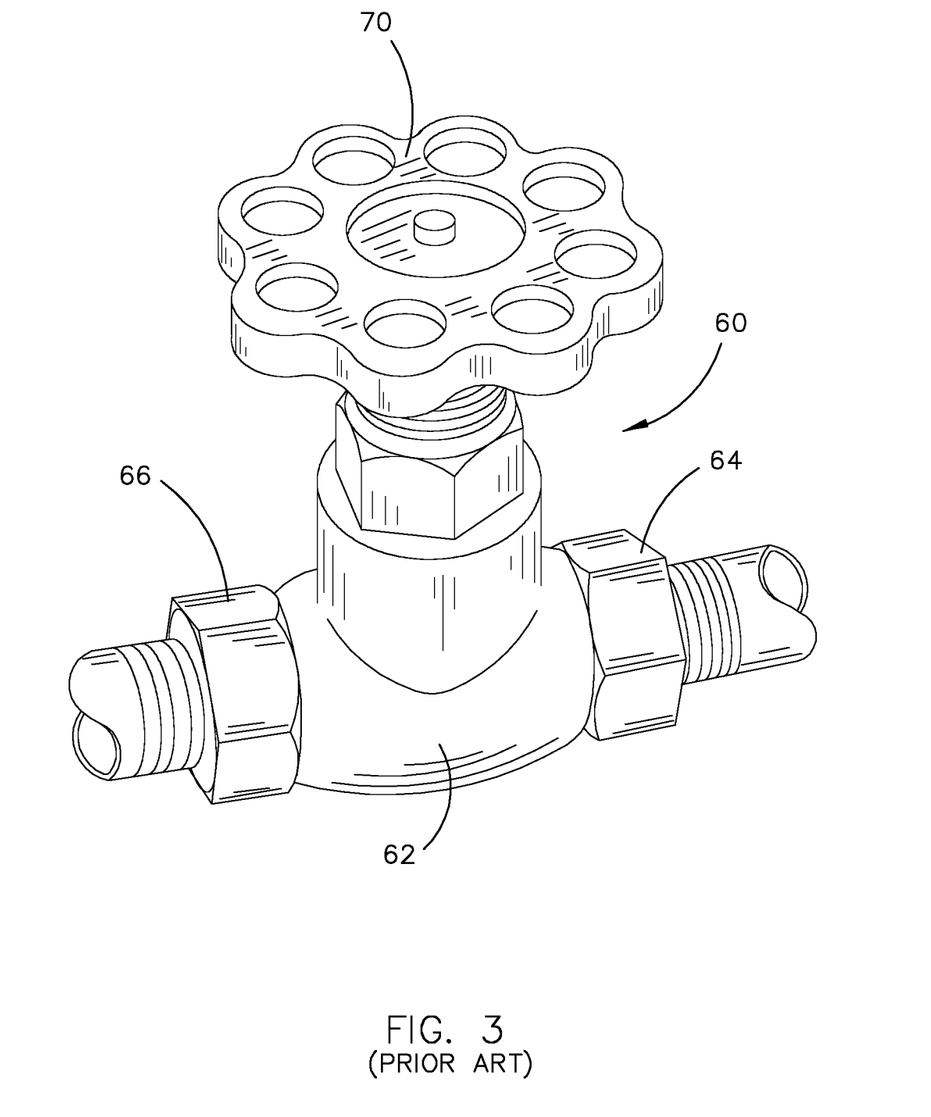
FIG. 3 is a perspective view of a prior art valve having a turnable handle with which the lockout device of FIG. 1 is used.

Referring to FIG. 4, the lockout device as just described is shown in use with the prior art valve of FIG. 3. As shown in the figure, the main body 12 of the lockout device is positioned atop the valve handle 70, with the second end 16 of the main body resting directly on the handle. The cable 46 is extends downwardly from the cap 18, through an aperture in the valve handle 70 and down around the bottom of the valve body 62, and then upwardly through another aperture in the valve handle, and up through notch 30 in the cap. The wing 38 is rotated to its closed position so that the cable is securely trapped within the notch. The shackle 72 of a padlock 74 is inserted through the aligned apertures 44, 34 in the cap and wing, respectively, to secure the cable and the lockout device in place.

With the locking device thus attached, it can be seen that operation of the valve handle is inhibited by the cable, which prevents rotation of the handle. It can also be seen that the cable may be pulled taut before closing the wing to trap the cable, effectively eliminating any slack in the cable and securing the lockout device tightly to the valve handle. As seen in FIG. 4, the remaining pair of aligned apertures in the cap and wing may be used to attach a lock-out notification tag, preferably indicating the time and date of installation and contact information for the person responsible for placing the lockout device.

It should be understood that the lockout device as just described may similarly be used with a valve having a handle with an outer perimeter smaller than the inner diameter of the main body of the device. In that case, with reference to FIG. 4, the main body 12 would fit down and over the handle, with the bottom end 16 of the lockout device resting against the valve body 62 or against the inlet and outlet ports of the valve. The cable would be similarly routed, down from the cap 18, under the valve body 62, and up through slot 30, and would be similarly secured with the wing 38 closed to trap the cable within the slot. Thus, the entire handle of the valve would be enclosed within the main body of the lockout device, preventing access to the handle and preventing operation of the valve.

It should further be understood that, while the lockout device of the depicted exemplary embodiment is cylindrical in shape with a circular cap, the lockout device of the present invention may be embodied in devices having other shapes. For example, the main body of the lockout device may be assembled from individual wall pieces forming an enclosed polygon, so that the device may be triangular, pentagonal, hexagonal, octagonal, or other enclosed shape. Or, the main body may be formed or molded to a specific shape, for example, to conform to the shape of common valve handle so that the device fits snugly over that handle. Furthermore, it should be understood that the shape of the cap and wings need not necessarily conform to the shape of the main body. For example, a square or octagonal shaped cap may be used in conjunction with a round or triangular shaped main body. These and other variations are contemplated and within the scope of the present invention.

Figure 5:
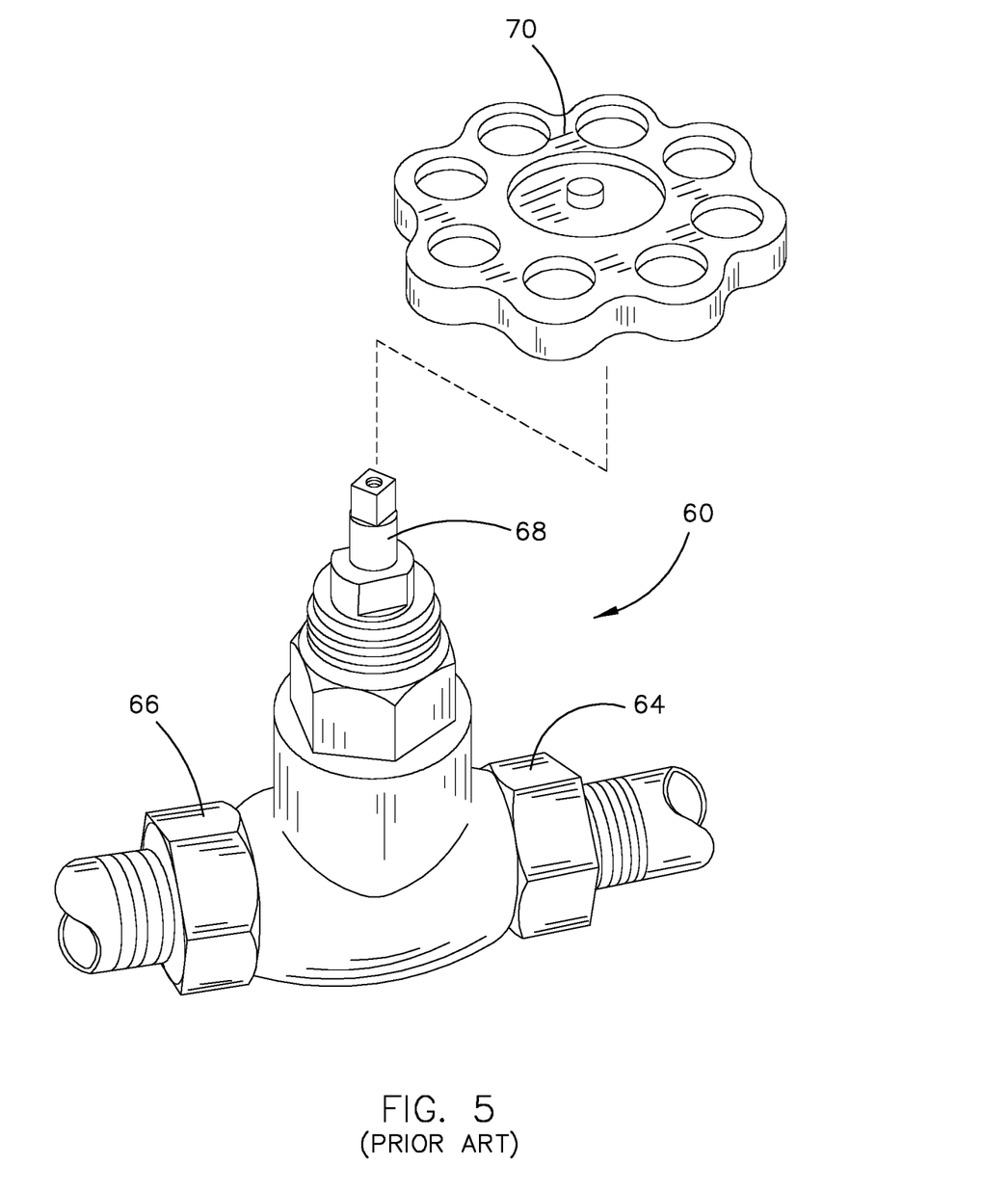
FIG. 5 is a perspective view of the valve of FIG. 3 with the handle removed.
Figure 6:
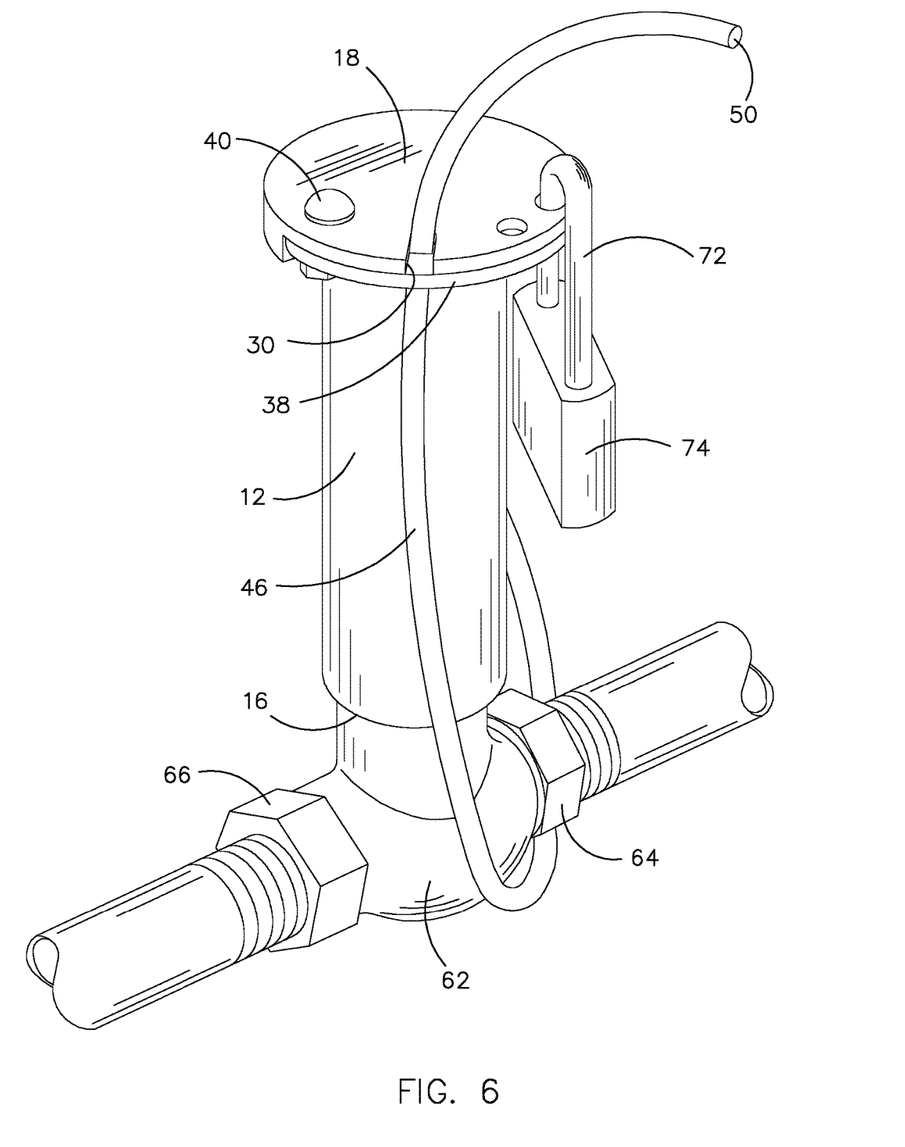
FIG. 6 is a perspective view of the lockout device of FIG. 1 in use with the valve of FIG. 5.

Referring to FIGS. 5 and 6, the operation and use of the described embodiment of the lockout device 10 described above in conjunction with a typical manually operated valve having no attached handle will now be described.

Looking to FIG. 5, the manually operated valve as described in FIG. 3 is depicted with the valve handle 70 removed and the valve stem 68 extending upwardly from the valve body 62. Removing the handles from valves in operating systems is often done to prevent accidental or nuisance operation of a valve which needs to remain in a fixed position. It should be apparent that while the handle is removed, the valve is not actually secured, but is still operable by turning the valve stem, which can be accomplished using an alternate handle, or using a wrench or other tool to operate the valve.

Referring to FIG. 6, a locking device as previously described is shown in use with the prior art valve of FIG. 5, which has its handle 70 removed. As shown in the figure, in this exemplary use of the locking device, the main body 12 of the lockout device is positioned over the valve stem and down onto the valve body 62 such that the valve stem is entirely enclosed by the main body, with the second end 16 of the main body resting directly against the valve body 62. The cable 46 extends downwardly from the cap 18, and down around the bottom of the valve body 62, then upwardly on the other side of the valve body and up through notch 30 in the cap. The wing 38 is pivoted about fastener 40 to its closed position so that the cable is securely trapped within the notch. The shackle 72 of a padlock 74 is inserted through the aligned apertures 44, 34 in the cap and wing, respectively, to secure the cable and the lockout device in place.

With the valve lockout device thus attached, it can be seen that operation of the valve is prevented, as access to the valve stem is prohibited. As previously described, with the cable pulled taut before being trapped into place in notch 30, the locking device is securely maintained in place on top of the valve. It should be understood that, in addition to the padlock 74 securing the lockout device in place, a tag may be attached to the device through aperture pair 32,42 to notify others of the information associated with the lockout, such as time, date, and contact information.

It should be further understood that the lockout device as just described may be used to secure a valve with its handle removed in a configuration other than that depicted in FIG. 6. While in FIG. 6 the lockout device is shown as fitting to the valve body 62 with the bottom edge 16 of the main body 12 resting against a boss on the valve body, the lockout device may similarly be used with valves having different proportions and dimensions than that shown. For example, the device may be used with a smaller sized valve having a smaller diameter boss surrounding the valve stem, in which case the lockout device would fit further down onto the valve body 62 so that the bottom edge 16 of the main body 12 rests against the inlet 64 and outlet 66 ports of the valve, or against the pipes or lines leading into those ports. Or, in the case of a larger valve, or a valve having a longer-extending valve stem, the lockout device may not seat down against the valve body at all, the bottom surface of the cap 18 may rest against the top end of the valve stem. In any of those alternative configurations, the lockout device encompasses at least a portion of the valve stem and can be securely fastened in place by ensuring that the cable 46 is pulled tight as it is locked in to slot 30.

Figure 7:
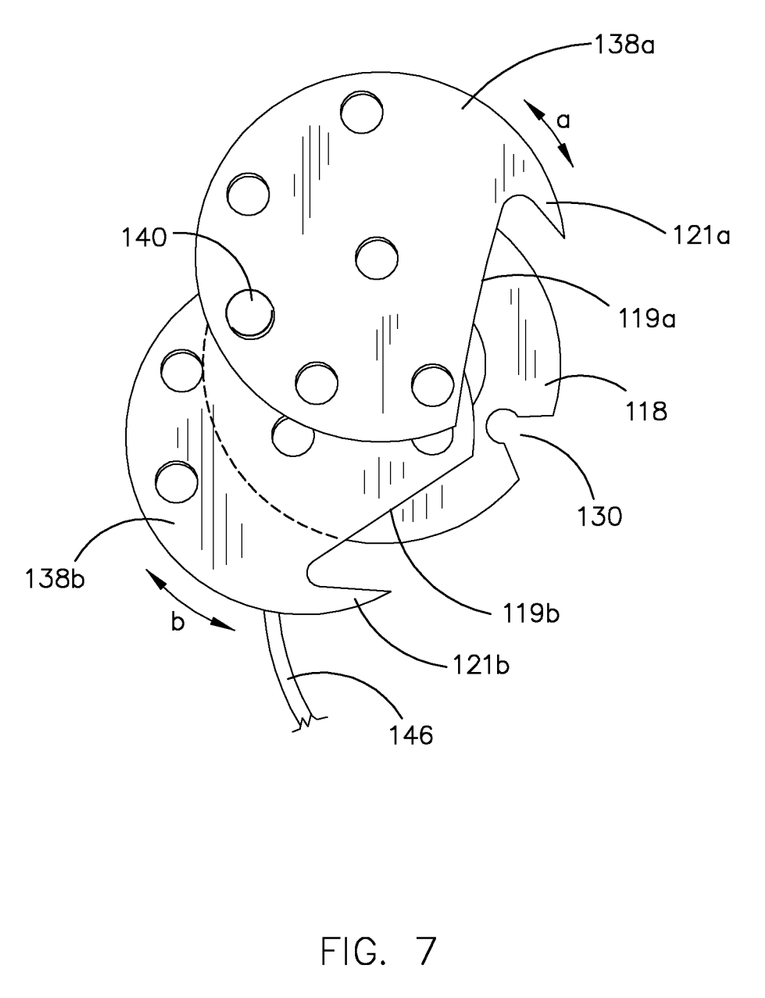
FIG. 7 is a top view of a lockout device in accordance with a second exemplary embodiment of the present invention in an open position.
Figure 8:
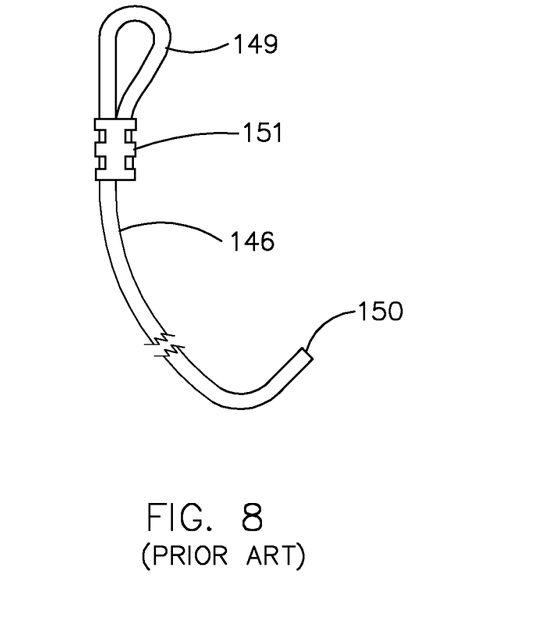
FIG. 8 is a perspective view of a prior art locking cable.
Figure 9:
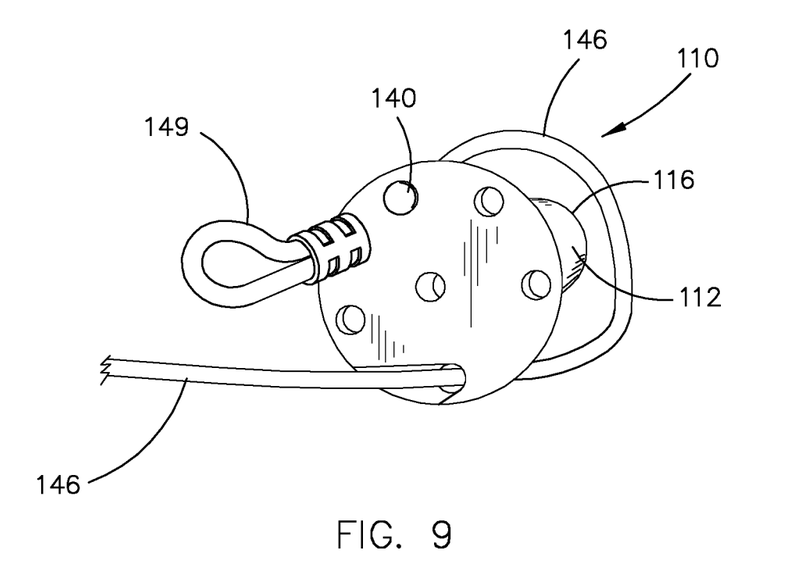
FIG. 9 is a top perspective view of the lockout device of FIG. 7 in a closed and locked position in use with the cable of FIG. 8.

Turning to FIGS. 7 through 9, a valve lockout device in accordance with a second exemplary embodiment of the present invention, used in conjunction with a prior art cable, is depicted generally by the numeral 110. Similar to the first exemplary embodiment described previously, the lockout device 110 comprises a hollow cylindrical main body 112 extending between a first, upper end and a second, lower end 116. A generally circular cap 118 is affixed to the upper end of the main body, with the lower end remaining open to allow access to an interior cavity defined by the inner wall of the cylindrical main body. The cap 118 is preferably affixed to the main body 12 using a glue or adhesive, alternatively the cap may be attached to the main body with screws, brads or other fasteners known in the art.

The circular cap 118 is positioned concentrically with the center axis of the cylindrical main body 112, but is larger in diameter, such that the cap covers the upper end of the main body 112 and protrudes outwardly around the periphery of the upper end. A generally "V"-shaped notch 130 formed in the cap 118 extends inwardly from the outer perimeter of the cap and towards the center of the cap. A series of apertures in the cap are positioned to align with corresponding apertures in two wings 138*a*, 138*b*, when the wings are in their closed position as depicted in FIG. 8. The wings 138*a*, 138*b* are pivotably attached to the cap 118 at a pivot point positioned near the periphery of the cap, opposite the "V"-shaped notch 130, via a fastener 140.

The two wings 138*a*, 138*b*, are generally planar and circular-shaped, sized to conform substantially to the shape and size of cap 118. As best seen in FIG. 7, each wing has a narrow segment removed along one side, leaving a flat edge 119*a*, 119*b* and a pointed hook 121*a*, 121*b* along that side of the wing. The fastener 140 preferably includes a cylindrical body that extends through the wing and lip, allowing the wing to easily pivot. Most preferably fastener 140 is a rivet. Alternatively, a bolt, screw, pin, or any other type of fastener known in the art may be used. Looking still to FIG. 7, the two wings 138*a*, 138*b* are identical, with one of the wings inverted sot that the two are arranged in a mirror image configuration. Thus configured, the wings can be rotated about the pivot point at fastener 140, as indicated by directional lines a and b, between an open position (as depicted in FIG. 7) and a closed position (as depicted in FIG.

9). In the closed position, the apertures in each wing 138a, 138b are aligned with the corresponding apertures in the cap 118.

The main body 112, cap 118, and wings 138a, 138b are preferably manufactured or formed from a rigid, strong material such as a plastic, metal, or composite material. Most preferably, they are made of polyvinyl chloride (PVC) or other plastic material.

Turning to FIG. 8, a prior art cable for use in conjunction with the lockout device of the present invention is designated as numeral 146. A loop 149 is formed at one end of the cable, with a ferrule 151 securing the end of the cable to the cable body to maintain the loop. The other end of the cable 150 remains free as depicted in the figure. The cable 146 is preferably flexible, formed from stranded wires and covered with vinyl or other protective coating.

With reference to FIGS. 7 through 9, in use and operation the valve lockout device 110 is positioned either atop a valve handle, or over a valve handle and/or a valve stem as previously described with respect to the first exemplary embodiment discussed above. With the lockout device in position, the free end 150 of cable 146 is routed down through one set of aligned apertures in the cap 118 and wings 138a, 138b, preferably pulled through so that the ferule 151 is positioned against the top of the locking device, i.e., against upper wing 138a.

The cable is routed in a manner as previously described to secure the lockout device to a valve body, with the cable directed around the valve body and up through the notch 130 in the cap. The two wings 138a, 138b are rotated towards each other to their closed position so that the cable is securely trapped within the notch and the apertures in the wings align with the corresponding apertures in the cap 118. As previously described, the device can be secured by inserting the shackle of a padlock through one set of the aligned apertures and a notification tag can be attached through another of the sets of aligned apertures. Similarly, a tag may be attached to another set of aligned apertures notifying of the lockout.

From the foregoing, it will be seen that the valve lockout device of the present invention is well adapted to attain all ends and objectives herein-above set forth, together with the other advantages which are obvious and which are inherent to the invention. As described, in one embodiment, the lockout device includes and attached cable that is secured by a single wing within a notch in the cap of the device. In another embodiment, an unattached cable is routed through an aligned set of apertures, and secured by two wing within a notch in the cap of the device. It should be understood that the variations and combinations depicted and described with respect to the exemplary embodiments are illustrative, and that other combinations are within the scope of the present invention. For example, the first exemplary embodiment may be configured without an attached cable, and may instead be used in conjunction with a separate, unattached cable as described herein with respect to the second exemplary embodiment. Or, an embodiment using a single wing having a circular shape, rather than elongated, is contemplated by the present invention. These variations and combinations and sub combinations of features of the various embodiments described and depicted herein are within the scope of the present invention.

Since many possible embodiments may be made of the invention without departing from the scope thereof, it is to be understood that all matters herein set forth or shown in the accompanying drawings are to be interpreted as illustrative, and not in a limiting sense.

The term "substantially", "approximately", or any other qualifying term as used herein may be applied to modify any quantitative representation which could permissibly vary without resulting in a change in the basic function to which it is related. For example, in one embodiment the wings of the lockout device are described as conforming substantially to the shape and size of the cap, but may permissibly vary from that configuration if the variance does not materially alter the capability of the invention.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A valve lockout device, comprising:
    an elongated main body extending between first and second ends, the main body comprising at least one wall defining an interior cavity for receiving at least a portion of a valve to be secured;
    a cap affixed to and covering at least a portion of the first end of the main body, the cap comprising a notch extending inwardly from an outer periphery of the cap; and
    a wing having an elongated body pivotably attached to said cap, said wing movable between an open position in which the wing body is positioned away from the main body and a closed position in which the wing body is positioned adjacent the main body, wherein the wing secures a cable within the notch when the wing is in the closed position.

2. The valve lockout device of claim 1, wherein:
    the cable is affixed at one end to the cap, an outer circumference of the cable sized to be received within the notch.

3. The valve lockout device of claim 1, wherein the cap conforms to the shape of the first end of the main body and substantially covers the first end.

4. The valve lockout device of claim 3, wherein the cap is larger than the first end of the main body such that a lip protrudes outwardly from the main body around at least a portion of a periphery of the first end.

5. The valve lockout device of claim 4, wherein the lip comprises a narrower portion and a wider portion, wherein the body of the wing conforms to the narrower portion when the wing is in the closed position.

6. The valve lockout device of claim 5, wherein the wing comprises an aperture extending therethrough and the narrower portion of the lip comprises an aperture extending therethrough and wherein the wing aperture aligns with the lip aperture when the wing is in the closed position.

7. A valve lockout device, comprising:
    an elongated main body extending between first and second ends, the main body comprising at least one wall defining an interior cavity for receiving at least a portion of a valve to be secured;
    a cap affixed to and covering at least a portion of the first end of the main body, the cap comprising a notch extending inwardly from an outer periphery of the cap; and
    first and second wings pivotably attached to said cap, each wing movable between an open position in which the corresponding wing body is positioned away from the main body and a closed position in which the corresponding wing body is positioned adjacent the main body, wherein the wings secure a cable within the notch when the wings are in the closed position.

8. The valve lockout device of claim 7, wherein:
the cable is affixed at one end to the cap, an outer circumference of the cable sized to be received within the notch.

9. The valve lockout device of claim 7, wherein the cap conforms to the shape of the first end of the main body and substantially covers the first end.

10. The valve lockout device of claim 7, wherein the first and second wings each comprises an aperture extending therethrough and the cap comprises an aperture extending therethrough, and wherein the first and second wing apertures align with the cap aperture when the wings are in the closed position.

11. The valve lockout device of claim 7, wherein the first and second wings are identically shaped, and are oriented in a mirror image configuration.

12. The valve lockout device of claim 11 where the first and second wings conform to the shape of the cap.

13. A valve lockout device, comprising:
a hollow cylindrical elongated main body extending between first and second ends, the main body defining an interior cavity for receiving at least a portion of a valve to be secured;
a circular cap affixed to and covering the first end of the main body, the cap comprising a notch extending inwardly from an outer periphery of the cap; and
at least one wing pivotably attached to the cap, the wing movable between an open position in which the wing is positioned away from the main body and a closed position in which the wing is positioned adjacent the main body, wherein the wing secures a cable within the notch when the wing is in the closed position.

14. The valve lockout device of claim 13, wherein the wing comprises an aperture extending therethrough and the cap comprises an aperture extending therethrough and wherein the wing aperture aligns with the cap aperture when the wing is in the closed position.

15. The valve lockout device of claim 14, wherein the at least one wing pivotably attached to the cap comprises:
first and second wings pivotably attached to the cap.

16. The valve lockout device of claim 15, wherein the first and second wings pivot in opposite directions to a closed position.

17. The valve lockout device of claim 13, wherein the cable is affixed at one end to the cap.

18. The valve lockout device of claim 17, wherein the first and second wings each comprise an aperture extending therethrough and the cap comprises an aperture extending therethrough and wherein the apertures in the first and second wings align with the aperture in the cap when the wings are in their closed positions.

* * * * *